Dec. 8, 1970  A. L. LA FONTAINE ET AL  3,545,128
LAWN EDGING
Filed Oct. 15, 1968
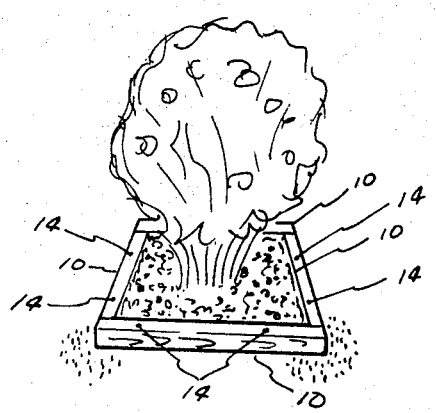
FIG·1
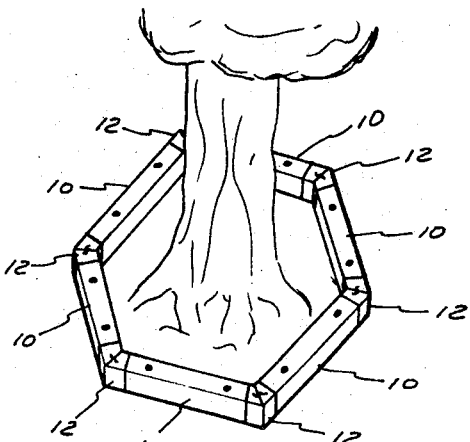
FIG·2
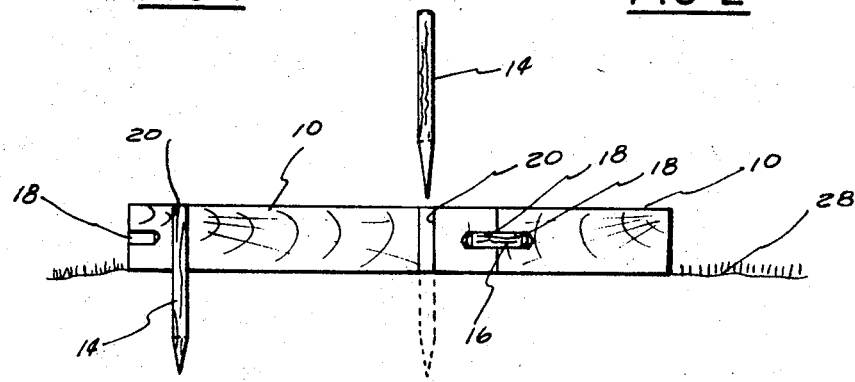
FIG·3
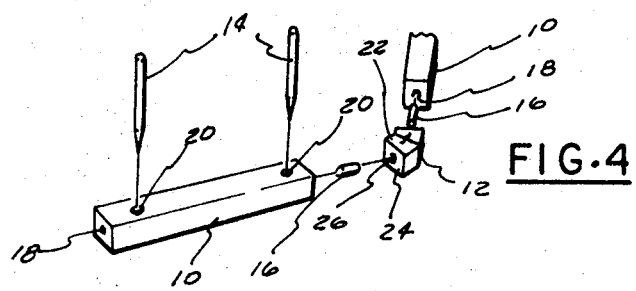
FIG·4
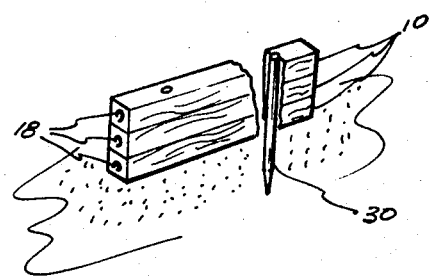
FIG·5
INVENTOR
ALLYN L. LA FONTAINE
EDWARD J. CHRZAN
BY
*Hauke Knaus Gifford & Patalidis*
ATTORNEYS

United States Patent Office 3,545,128
Patented Dec. 8, 1970

3,545,128
LAWN EDGING
Allyn L. La Fontaine and Edward J. Chrzan, Warren, Mich., assignors, by mesne assignments, to General Hardwood Company, Detroit, Mich., a corporation of Michigan
Filed Oct. 15, 1968, Ser. No. 767,746
Int. Cl. A01g *1/00;* E04b *1/10*
U.S. Cl. 47—33                                    8 Claims

ABSTRACT OF THE DISCLOSURE

A system for constructing lawn edging, or similar structures that are anchored to the ground, is disclosed. The system incorporates a set of wooden members, similar to miniature railroad ties, wooden stakes for anchoring the ties to the ground, and wooden dowels for connecting the ties to one another to form any of a variety of structures.

BACKGROUND OF THE INVENTION

This invention relates to a method for assembling lawn edging, bordering or the like, and more specifically to a method for joining a system of wooden components to one another to form a structure, and for anchoring the structure to the ground. It is a popular practice by many homeowners to form lawn edging, borders for gardens and framing surrounding the base of trees and the like, by arranging a series of railroad ties, usually with their ends in abutment, on the ground so that they provide a relatively attractive, natural appearance. However, there are many disadvantages associated with conventional railroad ties in the size they are commercially available. One problem is that they are large, bulky and difficult to handle because of their size. Another problem is that they are difficult to anchor to the ground in a relatively permanent position.

SUMMARY OF THE INVENTION

The broad purpose of the present invention is to provide a method for assembling a series of wooden components to form a lawn edging which has an ornamental appearance similar to conventional railroad ties, but in which the components are easier to handle, and easier to anchor to the ground, and are siuted for constructing a variety of wooden structures which are to be anchored to the ground.

The preferred embodiment of the present invention, which will be subsequently described of the present invention, which will be subsequently described in greater detail, comprises the steps of cutting a series of elongated, wooden elements or miniature ties preferably having a square cross section from standard size lumber and forming sockets in the ends of each wooden element and in their sides for receiving dowels and stakes. For purposes of description the term "ties" in this application, unless otherwise indicated, refers to the elongated wooden element. The ties are cut with the a cross section of approximately 3″ square from standard size lumber, into standard lengths such as 1 foot, 3 feet and 4 feet. In addition, the system employs wooden corner pieces so that the ties can be positioned in abutment at angles other than 90° between adjacent ties. The corner pieces each have two faces that are preferably either 30° or 90° with respect to one another for abutment with the ends of the ties. The ties and the corner pieces are treated with a suitable wood preservative, preferably by being dipped in a creosote mixture.

A pair of elongated wooden stakes are provided with each tie. Each stake has a length greater than the thickness of the tie and a pointed lower end to assist in thrusting the stake into the ground.

In order to form an edging for a lawn, several ties of a suitable length are placed on the ground with each tie having a socket, extending between its upper and lower sides, disposed perpendicular to the ground. Each stake is then inserted through the upper end of its socket so that its pointed end is passed through the tie to a position in which it contacts the ground. The stake is then thrust into the ground until its upper end is flush with the upper side of the tie. Each socket has a close fit with its stake so that the tie is firmly secured to the ground. The ends of adjacent ties are connected to one another by wooden dowels or by the corner pieces which are, in turn, connected to the ends of the ties by the dowels.

Each wooden component of the system, in addition to providing the ornamental attractiveness of conventional railroad ties, is light in weight so that a person of relatively small physical capability can easily position the ties and then anchor them to the ground. Furthermore the ties can be assembled into a variety of structures that are anchored to the ground and for which conventional ties are not readily suited. For instance, they can be stacked to form a stand for garbage cans; they can be recessed in the ground to form an attractive, poured-in-place form for concrete sidewalks, patios and the like; or they can be tiered to form flower beds, retaining walls and the like.

It has been found that by forming the ties from a dried hardwood, such as maple, and the dowels and stakes of a different wood such as birch, the dowels and the stakes tend to swell in their respective sockets when exposed to moisture on the ground so that they form a tight joint after having been mounted on the ground.

It is therefore an object of the invention to provide a method for assembling a lawn edging that simulates railroad ties but which is easier to assemble and provides an improved connection between the edging and the ground. Another object of the invention is to provide a method for forming a structure that is anchored to the ground and composed entirely of wooden components and connections. Another object of the invention is to provide an improved method for anchoring wooden ties to the ground by stakes inserted in sockets in the ties which tend to swell in the sockets when exposed to moisture so that they provide a tighter fit after being mounted on the ground.

Still further objects and advantages of the present invention will be readily apparent to those ski*l*led in the art to which the invention pertains upon reference to the following detailed description.

DESCRIPTION OF THE DRAWING

The description refers to the accompanying drawing, in which like reference characters refer to like parts throughout the several views and in which:

FIG. 1 is a perspective view showing a border for the base of a tree formed by the preferred method entirely of the preferred ties;

FIG. 2 shows a border for another tree formed by the preferred method, but employing both ties and corner pieces;

FIG. 3 is a view showing the manner in which the ties are anchored to the ground;

FIG. 4 is an exploded view of the border of FIG. 2; and

FIG. 5 is a perspective view showing another arrangement in which the ties are tiered one above the other.

DESCRIPTION OF THE PREFERRED EMBODIMENT

Now referring to the drawing, the preferred method comprises the formation of a plurality of wooden components or edging members having four basic configurations, including a miniature tie, generally indicated at 10, a cornerpiece 12, a stake 14 and a dowel 16. The basic components readily adapt themselves for assembly to form a variety of structures that are to be anchored to the ground.

The tie 10 is preferably square in cross section with 3" sides. The ties are formed in standard lengths including 1 foot lengths, 3 foot lengths and 4 foot lengths. Each tie 10 is formed of dried lumber and preferably of a hardwood such as maple so that it is relatively light and has long-wearing properties. Each tie 10 is formed with a socket 18 in the center of each end for receiving a half of a dowel 16. In addition, the tie is formed with a pair of sockets 20 adjacent each end which extend from its lower side, which is to be placed facing the ground, to its upper side. After the sockets have been formed in the tie, it is treated with a suitable preservative, preferably by being entirely dipped in a bath of creosote so that it acquires a relatively dark brown appearance.

The dowels 16 are also formed of dried wood and have a length of 2 inches and a diameter of ½ inch. The dowels are formed of a wood that is different from the tie, such as birch.

The stakes 14 are also preferably formed of birch and like the dowels, are treated with creosote so that they will not rot when exposed to moisture, such as dew, after being anchored to the ground. They are about ½ inch in diameter and 8" long, with their lower ends being pointed so as to provide a relatively easy penetration into the ground. The relative diameters of the stakes and dowels are chosen so as to provide a relatively close fit that allows the dowels to be easily inserted into their respective sockets.

Each cornerpiece 12 is preferably formed of a pair of wooden halves 22 stapled together, and formed with faces 24 which are positioned in abutment with the ends of a pair of adjacent ties. The two faces of each corner piece are preferably formed at a predetermined angle such as 30° or 90°. Each face has a socket 26 in its center to that it can be connected by a dowel 16 to the end of the tie. The corner pieces 12 are also treated with creosote so that they will not rot.

Referring to FIG. 3, each tie 10 is anchored to the ground 28 by initially positioning it such that the sockets 20 are perpendicular to the ground. The lower pointed end of a stake 14 is then inserted through the upper end of the socket 20 until the pointed end is in contact with the ground 26. The stake is then thrust into the ground by pounding its upper end until it is substantially flush with the upper side of the tie. Since approximately 5 inches of the stake is embedded in the ground, the tie is securely anchored against displacement parallel to the ground. Normally only two stakes are necessary to securely anchor the tie in position. To connect either a second tie to the end of the first positioned tie or a corner piece to the end of the first tie 10, a dowel 16 is partially inserted into the socket 18 in the end of the tie. The corner piece or a second tie having a similar socket 18 is then positioned on the ground with its end in face-to-face abutment with the first tie so that the dowel provides a connection between the two. The second tie is then staked in place in the same manner as the first tie.

It is to be understood that one of the major features of the invention is the manner in which the ties are anchored to the ground. Because the ties and the stakes are in contact with the ground 26, it has been found that the stakes tend to absorb moisture, and because they are of a different wood than the ties, tend to expand or swell within their sockets 20 so that they gradually form a very tight joint with the tie tending to prevent their separation from the tie. Furthermore, because of the manner in which each stake is initially supported in an upright position with its lower end in its socket, they are easier to drive into the ground.

FIG. 1 shows an arrangement employing the preferred method in which four ties 10 have been arranged in a square configuration about the base of a tree, each tie being anchored to the ground by a pair of stakes 14. FIG. 2 illustrates another arrangement in which the ties have been connected with corner pieces 24 to form a six sided configuration about the base of a tree.

FIG. 5 illustrates still another structure employing the preferred method in which three ties 10 have been stacked one above the other. In this arrangement, a stake 30 having a sufficient length to be passed through three ties as well as into the ground, is illustrated. However, it is to be understood that this arrangement could also be constructed by using the basic components, that is by anchoring the lowermost tie to the ground with a pair of stakes, and then connecting the upper two ties to the lowermost tie and to one another by using a series of dowels 16. The advantage of being able to stack the ties one above the other is that they readily lend themselves to the erection of stands, retaining walls, and other structures in which it is desired to form some sort of a wall.

Thus it is to be understood that we have described a method for forming lawn edging or other similar outdoor wooden structures in which a few wooden components having a minimum of basic shapes for connecting the components to one another and for anchoring them to the ground has been described. The miniature ties 10 are relatively easy to handle, to transport and to assemble with one another as compared to conventional railroad ties. They can be easily anchored to the ground. Both the stakes and the dowels provide means for connecting the ties and corner pieces in a joint which provides a more secure fitting as the structure becomes exposed to the moisture on the ground.

Having described our invention, we claim:

1. A structure on the ground of a lawn or the like having a source of moisture, comprising:
   a horizontally disposed first edging member having a substantially vertical first socket therein, and a second socket in the end thereof for receiving a dowel;
   a stake having a lower end received in the ground, and a portion disposed in the first socket of the edging member, the stake having a diameter allowing its passage into said first socket prior to being disposed therein, and being formed of an expansible wood such that as ground moisture is absorbed by the stake, the diameter of the stake expands in said first socket to so engage the edging member as to prevent relative movement therewith;
   a second edging member having a socket for receiving a dowel; and
   a dowel received in the sockets of the edging members, the dowel being formed of an expansible wood such that as ground moisture contacts the dowel, it expands in said sockets to so engage the first and second edging members as to prevent relative movement between them.

2. A structure as defined in claim 1, in which the first socket extends completely through the first edging member, and the stake has a length greater than the length of the first socket.

3. A structure as defined in claim 1, in which the first edging member is formed of a hardwood.

4. A structure as defined in claim 3, in which the hardwood is maple.

5. A structure as defined in claim 1, in which the stake is formed of birch.

6. A structure as defined in claim 1, in which the first edging member is treated with creosote.

7. A structure on the ground of a lawn or the like having a source of moisture, comprising:
- an elongated wooden tie having a substantially square cross-section, the tie having an elongated first socket substantially at right angles to the length of the tie, and a second socket formed in the end of the tie, the tie being substantially horizontally disposed such that the first socket is in a position perpendicular to the ground;
- a wooden corner piece having a socket, and being disposed adjacent the end of the tie;
- an elongated stake having a lower pointed end received in the ground, and an upper end disposed in the first socket of the tie, the stake having a diameter allowing its passage into the first socket prior to being disposed therein, and being formed of an expansible wood such that as ground moisture is absorbed by the stake, it expands in the first socket to so engage the tie as to prevent relative movement therewith; and
- a dowel having one end received in the second socket of the tie, and its opposite end in the socket of the corner piece, the dowel being formed of an expansible wood for absorbing ground moisture to expand in said sockets to so engage the tie and the corner piece as to prevent relative movement between them.

8. A structure as defined in claim 7, in which the first socket is formed adjacent one end of the tie, and including another elongated socket formed adjacent the other end of the tie substantially parallel to the first socket.

References Cited

UNITED STATES PATENTS

| | | | |
|---|---|---|---|
| 477,721 | 6/1892 | Webb | 94—31 |
| 598,631 | 2/1898 | Jetley et al. | 52—585X |
| 2,348,010 | 5/1944 | Klonaris | 52—585 |
| 2,794,375 | 6/1957 | Di Falco et al. | 94—31 |

ROBERT E. BAGWILL, Primary Examiner

U.S. Cl. X.R.

52—585